US006509962B1

(12) United States Patent
Burns, Jr.

(10) Patent No.: US 6,509,962 B1
(45) Date of Patent: Jan. 21, 2003

(54) INTEGRATED CIRCUIT IMAGE SENSOR FOR WHEEL ALIGNMENT SYSTEMS

(75) Inventor: Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/566,247

(22) Filed: May 5, 2000

(51) Int. Cl.[7] .......................... G01B 11/26; G01C 1/00; G02B 6/12
(52) U.S. Cl. .................... 356/139.09; 385/14
(58) Field of Search ............... 356/139.09; 33/288; 385/14

(56) References Cited

U.S. PATENT DOCUMENTS

| | | | | |
|---|---|---|---|---|
| 4,259,576 A | * | 3/1981 | Gridley et al. | 250/338 |
| 5,060,282 A | * | 10/1991 | Molley | 382/42 |
| 5,243,417 A | | 9/1993 | Pollard | 358/103 |
| 5,354,977 A | * | 10/1994 | Roustaei | 235/472 |
| 5,373,357 A | * | 12/1994 | Hopkins et al. | 356/121 |
| 5,488,471 A | * | 1/1996 | McClenahan et al. | 356/139.09 |
| 5,489,983 A | * | 2/1996 | McClenahan et al. | 356/139.09 |
| 5,519,204 A | * | 5/1996 | Rudd et al. | 250/205 |
| 5,550,677 A | | 8/1996 | Schofield et al. | 359/604 |
| 5,600,435 A | * | 2/1997 | Bartko et al. | 356/139.09 |
| 5,748,321 A | * | 5/1998 | Burks et al. | 356/386 |
| 6,057,925 A | * | 5/2000 | Anthon | 356/419 |

OTHER PUBLICATIONS

A low–power digital camera–on–a–chip implemented in CMOS active pixel approach, Pain et al., Proceedings of the 12th International Conference on VLSI Design, pp. 26–31, Jan. 1999.*
On–focal–plane signal processing for current–mode active pixel sensors, Nakamura et al., IEEE Transactions on Electron Devices, vol. 44(10), pp. 1747–1758, Oct. 1997.*
Survey of CMOS Imagers, Ogiers, downloaded from http://www.diei.unipg.it/PAG_PERS/daniele/BIBLIOTECA/1997%20–%20Survey%20of%20CMOS%20imagers%20–%20issue%201.0%20–%20part%201.pdf, 1997.*
Silicon VLSI processing architecture incorporating integrated optoelectronic devices, by Cat et al., Proceeding of the Sixteenth Conference on Advanced Research in VLSI, Mar. 27–29, 1995, pp. 17–27, Sep. 1995.*
256×256 CMOS active pixel sensor camera–on–a–chip, by Nixon et al., IEEE Journal of Solid–State Circuits, vol. 31(2), pp. 2046–2050, Dec. 1996.*
Yang Ni (institut National des TeleCommunication, France) and Francis Devos (Institut d'Electronique Fondamentale, France), *An Analog Smart Sensor For Active Obstacle Detection*; pp. 1101–1103.
Computergram International Copyright 1995 Apt Data Services Ltd., Apr. 6, 1995; West 2002 No Claim to Orig. U.S. Govt. Works; pp. 1–2.
Brian O'Rourke, Cahners InStat Group; *Carving Out New Frontiers*; Jan., 2002 Spie's oeMagazine; pp. 36–37.
James Jansick, Sarnoff Corp.; *Dueling Detectors*; Feb., 2002 Spie's oeMagazine; pp. 30–33.
Dave Litwiller of DALSA, *CCD VS. CMOS: Facts and Fiction*; reprint from the Jan. 2001 issue of PHOTONICS SPECTRA ©Laurin Publishing Co. Inc.

* cited by examiner

*Primary Examiner*—Thomas H. Tarcza
*Assistant Examiner*—Fred H Mull
(74) *Attorney, Agent, or Firm*—Thompson Coburn LLP; Gregory E. Upchurch

(57) ABSTRACT

An improved image sensor for computer systems that use images to calculate vehicle wheel alignments which includes an integrated circuit having a detector array for receiving an image containing vehicle wheel alignment information, an image sensor controller for operating the detector array and directing input/output for external communications outside the circuit, and an internal bus for communications within the integrated circuit. The sensor communicates wheel alignment information contained in the image with the computer system across an interface bus.

25 Claims, 2 Drawing Sheets

INTEGRATED CIRCUIT IMAGE SENSOR FOR WHEEL ALIGNMENT SYSTEMS

CROSS-REFERENCE TO RELATED APPLICATIONS

None.

STATEMENT REGARDING FEDERALLY SPONSORED RESEARCH OR DEVELOPMENT.

Not Applicable.

BACKGROUND OF THE INVENTION

1. Field of the Invention

This invention relates generally to vehicle wheel alignment systems and, more particularly, to image sensors and processors that are used to determine the angles of vehicle wheels and the distances between vehicle wheels.

2. Related Art

Aligning vehicle wheels within specific tolerances is important for optimal control of the vehicle and for consistent wear of the tires. Alignment is performed primarily by adjusting camber, caster, toe, and steering axis inclination. As part of calculating the alignment angles for the vehicle, the angles of the wheels must be determined. The angles can be determined relative to an external reference, such as found in machine vision systems, or relative to the other wheels, such as found in wheel-mounted systems. It is known that these angles can be measured using an electro-optical transducer that incorporates a solid state detector array. In the case of machine vision systems, the detector array may have multiple columns and rows forming an area to capture a two-dimensional image, and in the case of wheel-mounted systems, the detector array may only need to be linear, having a single row with as few as two receptor elements. In either case, the image on the detector must be analyzed meticulously so that accurate alignment angles can be calculated.

Wheel-mounted alignment systems typically have sensor heads on each wheel of the vehicle, and each sensor head has an emitter and a receiver that works in combination with at least one other sensor head along the vehicle's sides and across the vehicle. The receiver units may have photodiodes as set forth in U.S. Pat. No. 4,302,104 or a charge coupled device (CCD) as set forth in U.S. Pat. Nos. 5,018,853 and 5,519,489, and the emitter units may have a single source as in U.S. Pat. Nos. 4,302,104 and 5,018,853 or multiple sources as in U.S. Pat. No. 5,488,471. Angles and distances are calculated according to the positions of the spots or lines that are detected by the linear arrays.

Machine vision alignment systems typically use a solid state camera with an array detector mounted away from the vehicle to obtain an image of a wheel mounted target. The target incorporates an accurately reproduced pattern that has known control features, as set forth in U.S. application Ser. No. 08/781,284 filed Jan. 10, 1997. The position of the features in the image are found and the orientation of the wheel can be calculated by well known algorithms. Some machine vision systems do not use a predefined target but identify particular geometric features on the wheel or tire, such as projected light stripes or the circular wheel rim, and use the distortion of the geometry to determine positions and orientations.

In wheel alignment systems, the imaging requirements are somewhat different than a standard camera. Very precise measurements must be made at a rate of at least 2 Hz. on static or very nearly static scenes. This requires stable, low-noise images that have excellent focus and contrast. The accuracy of the measurement depends on the precision with which edges, centroids, corners, lines or boundaries can be determined. Methods for analyzing the image must take into account the possible sources of inaccuracy and compensate for them. To obtain these images, current wheel alignment systems use analog receivers that cannot be integrated onto an application specific integrated circuit (ASIC) with the image processor or the analog to digital converter.

CCD technology has become the dominant method for constructing the solid state receiver arrays. While many alignment systems have been made using CCD elements, the detector has some characteristics that are not ideal for a robust economical product. The CCD element is an expensive component that requires additional support electronics to create a digital output for processing or imaging. It requires a number of timing and control signals as inputs, many of which require different voltages. Supply voltages, clock phases and control signals must be carefully controlled so that extraneous electrical noise is not introduced into the system. The analog output of the CCD element must be converted to a digital format using a separate amplifier and an analog-to-digital converter.

The pixel structure of a CCD element also makes it susceptible to blooming. When light falls on each pixel, photons are converted to electrons which accumulate in the active area of the pixel. If the light is intense or the amount of time the electrons are allowed to accumulate is long, the capacity of the pixel structure to hold the charge will be exceeded. The charge then spills into adjacent pixels and blooming occurs. Most CCD elements have some form of anti-blooming control which minimizes the problem, but it cannot be fully prevented.

There are essentially three different types of CCD structures which may be used in wheel alignment systems, and each type has particular disadvantages. The interline transfer CCD structure has alternating rows or columns of pixels and collectors resulting in a low fill factor and making it susceptible to distortion. Between each row or column of pixels is a row or column for shifting the pixel charge, thereby reducing the photosensitive area to a small percentage of the sensor's total area. This low fill factor may distort intensity profiles, thereby increasing the possibility in machine vision systems that edges and centroids of objects in the image are improperly located. The full frame CCD structure has a high fill factor but requires an external shutter to control the integration time of the device. The extra cost and complexity of the shutter is detrimental for an economical system. A flame transfer CCD structure does not require a shutter and can have very high fill factors but can be susceptible to creating image smear since the exposure is controlled by shifting the entire image into a light protected storage area after the integration time period has elapsed. The shifting process takes place one line at a time so the last line into storage has been shifted through every other line position on the image. The shift is not instantaneous so some new charge is collected with every shift until the light protected area is reached. This smear effect is not usually a problem if the image transfer time is a small fraction of the total integration time. Where system cost is an issue, high flame rates are not possible and the effects of smear must be considered.

Additionally, with all CCD elements, it is not possible to address an individual pixel for read out. If the object of interest only occupies a small portion of the image, it is necessary to read out the entire image before the object can be analyzed. The lack of sub-array read out capability imposes a speed penalty on the system.

As evident from the above discussion, the use of a CCD for an image sensor puts some burdens on the wheel alignment system in terms of electronic design considerations. The result of these restrictions is increased system cost and loss of flexibility.

SUMMARY OF THE INVENTION

The present invention was developed to address these problems. Among the objects and features of the present invention is an improved sensor for measuring angles and distances in wheel-mounted alignment systems and positions and orientations in machine vision alignment systems.

A second object of the present invention is to provide such a sensor that it is fabricated by the same process that is used for other common electronic components such as DRAM circuits, and can therefore process images only in a particular region of interest, readout the pixels in a non-destructive or refreshing mode, reduce the time required to process detected images, and integrate additional support electronics into a single, less-expensive integrated circuit package and thereby eliminate any need for multiple input supply voltages.

A third object of the present invention is to provide such a sensor that increases the precision of the detected image by resisting blooming and eliminating smearing.

In one aspect of the present invention, an image sensor for a wheel alignment system includes an integrated circuit having a detector array and an interface bus for communications between the integrated circuit and a computer system. The detector array operates according to an image sensor controller, also formed on the integrated circuit, that communicates with the detector across an internal bus and directs input/output communications for the integrated circuit In a second aspect of the present invention, a method of reducing cycle time in processed images that are used in a vehicle wheel alignment system includes the steps of receiving an image on a detector array and processing the image in its entirety, identifying a region of interest on the detector array, limiting the sensor read out on subsequent images to only the region of interest, and calculating vehicle wheel alignment based on the image in the region of interest.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

Similar reference numbers indicate similar parts throughout the several views of the drawings.

DETAILED DESCRIPTION OF THE PREFERRED EMBODIMENTS

Figure 1:
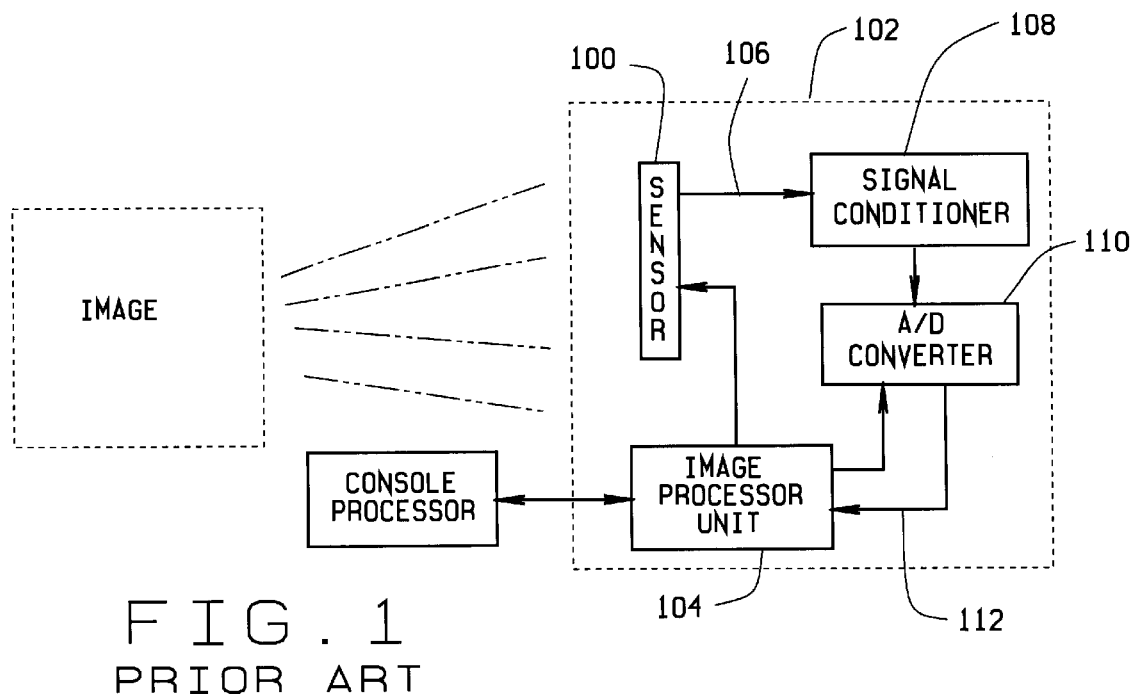
FIG. 1 illustrates a block diagram of a prior art image sensor and computer system for calculating vehicle wheel alignment using a wheel mounted sensor set.

Referring to the accompanying drawings, FIG. 1 illustrates a prior art image sensor used by a computer system to calculate vehicle wheel alignments. In prior art alignment systems, a solid state image sensor 100 is contained within a sensor head 102. Such a sensor head may be mounted on each wheel of the vehicle to work in combination with other sensor units, or the sensor head may be mounted away from the vehicle to view each wheel individually. An image processor unit 104 controls the sensor, and an analog signal 106 from the sensor passes through a signal conditioner 108 and an analog to digital converter 110. The processor receives a digitized image 112 from the converter, calculates the alignment angles using the image information and computational algorithms, and communicates with a console processor 114 to display the wheel alignment information to the user. As discussed above, the image processing illustrated in FIG. 1 must be performed on a separate digital circuit.

Figure 2:
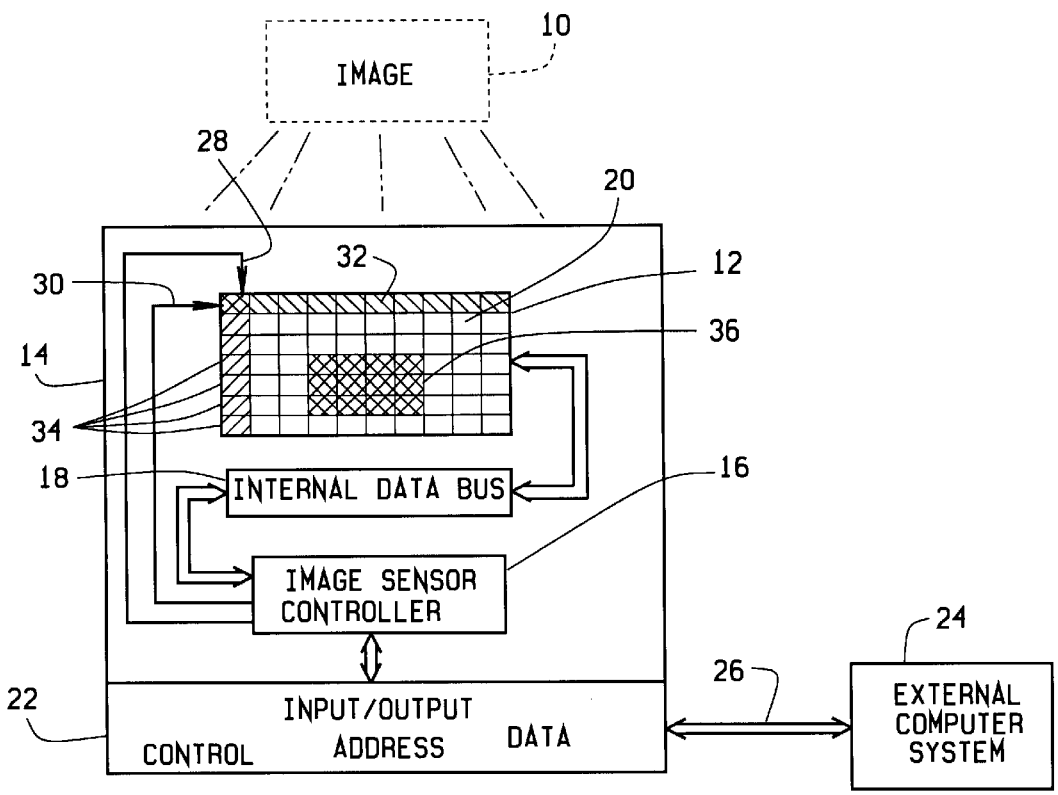
FIG. 2 illustrates a functional block diagram of an image sensor and computer system for calculating vehicle wheel alignment according to the present invention.

Referring to FIG. 2, a preferred embodiment of the present invention is illustrated. An image 10 is received by a detector array 12 that is formed on an integrated circuit 14. The circuit is fabricated using well known processes such as those for a complementary metal oxide semiconductor (CMOS). The integrated circuit also contains an image sensor controller 16 that communicates with the detector across an internal bus 18. The controller reads the output from a plurality of pixels 20 that comprise the array and sends signals that control the operation of the array. The controller also directs the input/output 22 for the integrated circuit, including signals for control, data and addresses, as it communicates with an external computer system 24 across an interface bus 26.

Each pixel 20 in the array has an address defined by its column 28 and row 30 in the array, incorporating one or more transistors at each site. Long exposure times or high intensity lights do not cause blooming because each pixel in the image detector is electronically isolated from the neighboring pixel and the excess charge of a saturated transistor bleeds into the integrated circuit's substrate. A single row 32 forms a linear detector array, and multiple rows 34 form a two dimensional detector array. The image sensor controller 16 can define the pixel addresses to be read, making it possible to scan the sensor only in a region of interest (ROI) 36. There is no image smear because each pixel is read at its address and there is no need to transfer the charge from the pixel to another register for output.

In addition to preventing smearing, the present invention uses the addressable scanning capabilities of the integrated circuit to reduce the error in the scanned image with more efficiency and speed and with less cost than possible with the prior art devices described above. One source of error inherent in all imaging devices is counting or Poisson noise, and this error is best reduced by averaging multiple images of the same scene. Prior art devices must read out the entire image before averaging can be performed on even a portion of the image. The present invention can more efficiently process a particular region of interest (ROI) 36, such as the portion of the detector array 12 corresponding to the target or emitter source. The sub-array scan capability of the CMOS image sensor greatly reduces the processing burden and enhances the rate at which measurements can be made. In prior art systems, image averaging must be done by an off-chip processor or host computer, but image averaging could be accomplished on-chip using the integrated circuit design.

Figure 3:
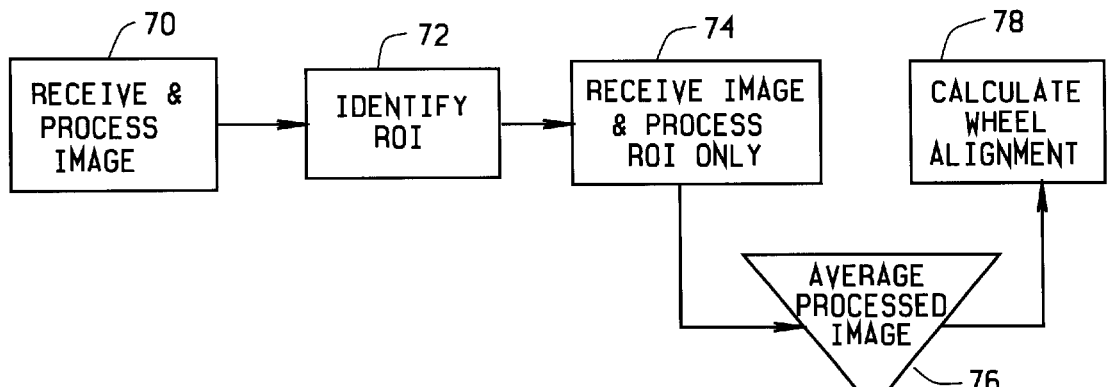
FIG. 3 illustrates a flow diagram for using the image sensor of FIG. 2 to reduce processing time in calculating vehicle wheel alignment in accordance with another aspect of the present invention.

Referring to FIG. 3, the first image is received and processed in its entirety in step 70. Either the integrated circuit or the computer system identifies a ROI on the detector that corresponds with the target image or emitter source image in step 72. The detector receives additional images; subsequent scans of the detector are limited to the ROI and processing is limited to the ROI in step 74. The ROI of multiple images are processed and the average processed image 76 is then used to calculate a wheel alignment in step 78. The entire process can be repeated automatically or can be manually reset.

Figure 4:
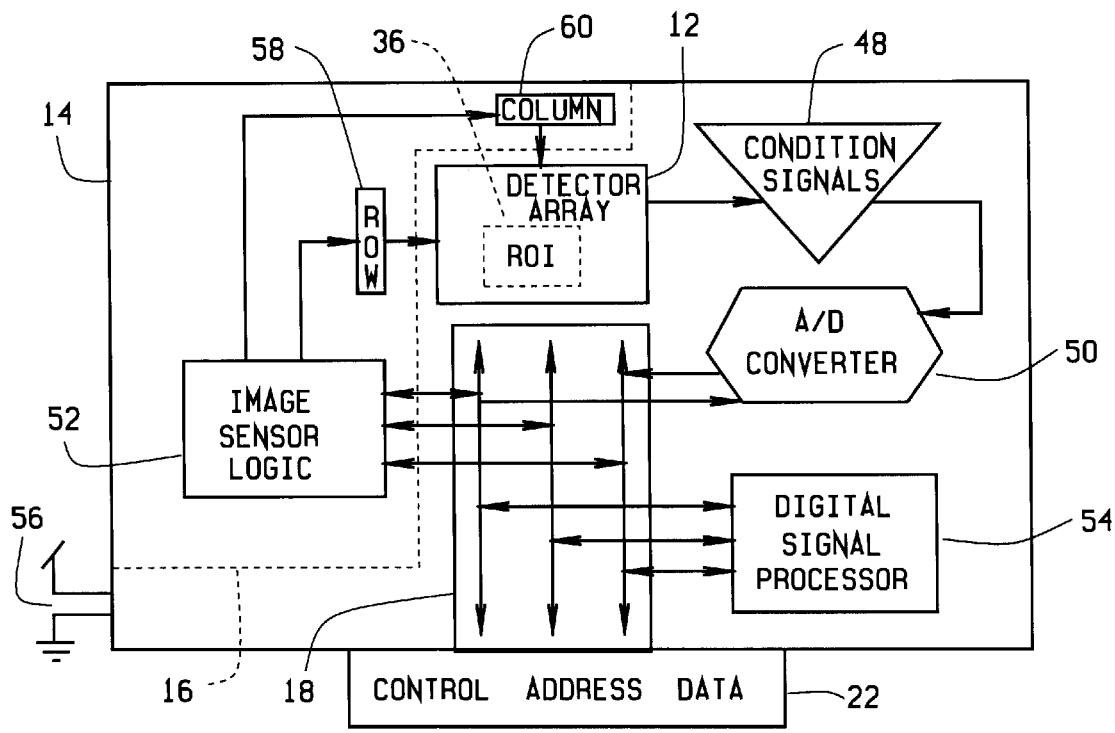
FIG. 4 illustrates an operational block diagram of the image sensor of FIG. 2.

Referring to FIG. 4, particular operations of the image sensor controller 16 and additional benefits of an integrated circuit 14 are now presented. An analog to digital converter 50 and a signal conditioning element 48 can be incorporated onto the integrated circuit, thereby decreasing the need for peripheral electronic elements. Additionally, image sensor logic 52 and a processor 54 can be programmed to create an application specific integrated circuit (ASIC). Depending on the ASIC, the processor can include a digital signal processor, a micro-processor, and/or a micro-controller processor. One such ASIC can be designed to calculate orientation and position in a machine vision alignment system, and another ASIC can be designed to calculate angles and positions in a wheel-mounted alignment system. The ASIC design allows for calculation of the wheel alignment within the image sensor itself using the same computational algorithms that are found in current image-based wheel alignment systems. These chips can be updated or replaced as integrated circuit technology increases processing speeds and improves image resolution.

The digital signal processor's logic can be programmed to identify the ROI 36 which is then communicated on the internal bus and read by the image sensor controller. The image sensor logic limits further read outs of the detector array 12 to the ROI 36 by directing the row decoder 58 and the column decoder 60 to obtain data from only those pixel addresses that comprise the ROI. The micro-processor can work with the digital signal processor for image averaging functions. The micro-controller processor can control the information sent to an off-chip processor or host computer and may even be able to stop the digital signal processor from processing an entire image if the ROI is identified in the first image.

Another desirable feature of the integrated circuit image sensor is the ability to operate with a single input supply voltage 56. This is of most importance in portable devices but offers significant advantages for fixed installations because of the simplified circuitry requirements. The integrated circuit also uses much less power than a typical equivalent CCD imager. These properties decrease the amount of internal heating that must be considered when building a precision camera. The heating can distort the image by moving or warping the optics and mounting hardware of the imaging device. Heat can establish convection currents which can create index of refraction variations in the air spaces of the optical system and induce random distortions into the image. By keeping the power dissipation as low as possible the thermal aspects of the camera design become more manageable and allow economic solutions.

Further system simplification can be accomplished by taking advantage of the many types of computer interfaces that are possible with an image sensor that is formed on an integrated circuit The image data can be transferred to a host computer by an on-chip direct parallel, universal serial bus (USB), or IEEE 1394 interface. This eliminates the need for a frame grabber which reduces cost and complexity. The image can be transferred to memory, such as under direct memory access (DMA) where it is immediately available for analysis by the system processor. The memory and processor can be located either in the sensor itself or in the external computer system. Additionally, in wheel alignment systems using multiple integrated circuit image sensors, the sensors can communicate with each other through their respective communication links to the computer system. Alternatively or in addition to the communication links with the computer system, communication links can be established between the sensors themselves. In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the pixels can be read destructively or non-destructively, and if further integration is required, the integrated circuit may be formed to include a NTSC encoder, a color processor, an electronic shutter function, and/or automatic gain control. Single chip cameras which incorporate some or all of these features are being produced by Photobit, Hyundai Electronics, Elec Vision and others. Thus, the breadth and scope of the present invention should not be limited by any of the above-described exemplary embodiments, but should be defined only in accordance with the following claims appended hereto and their equivalents.

What is claimed is:

1. In a wheel alignment system, the wheel alignment system having an image sensor, a system processor having logic and memory for calculating a vehicle wheel alignment, and a console, the image sensor receiving images and operably communicating the images to the system processor to calculate vehicle wheel alignments and the console displaying the wheel alignment information to a user, the wheel alignment system having an improvement in the image sensor wherein the improvement comprises:

an integrated circuit having a detector array for receiving the images containing vehicle wheel alignment information, an image sensor controller for operating the detector array and directing input/output for external communications outside the circuit, and an internal bus for communications within the integrated circuit.

2. The improvement as set forth in claim 1 wherein the detector array is comprised of a plurality of pixels, each of the pixels being electronically isolated from neighboring pixels.

3. The improvement as set forth in claim 2 wherein the pixels in the detector array have means for resisting blooming.

4. The improvement as set forth in claim 1 wherein the integrated circuit is a CMOS integrated circuit.

5. The improvement as set forth in claim 4 wherein the integrated circuit has a single supply voltage.

6. The improvement as set forth in claim 1 wherein the integrated circuit further comprises an analog to digital converter, the converter communicating with the image sensor controller on the internal bus.

7. The improvement as set forth in claim 6 wherein the integrated circuit further comprises a digital signal processor, the digital signal processor communicating with the image sensor controller on the internal bus.

8. The improvement as set forth in claim 7 wherein the digital signal processor has logic for identifying a region of interest and the integrated circuit further comprises the system processor.

9. The improvement as set forth in claim 6 wherein the integrated circuit further comprises a digital signal processor that has logic for identifying a region of interest on the detector array and the image sensor controller has logic for limiting a read out to the region of interest.

10. The improvement as set forth in claim 1 wherein the integrated circuit further comprises ASIC image sensor logic for communicating with the system processor across an interface bus.

11. The improvement as set forth in claim 1 wherein the integrated circuit further comprises sub-array scanning of the detector array.

12. The improvement as set forth in claim 1 wherein the image sensor controller further comprises logic to access a region of interest on the detector array.

13. The improvement as set forth in claim 1 wherein the image sensor controller further comprises logic to read out data from a specified pixel address.

14. A method for reducing the time to process images used in a vehicle wheel alignment system, comprising the steps of:

receiving at least one image containing vehicle wheel alignment information on a detector array;

identifying a region of interest on the detector array; and calculating vehicle wheel alignment based on the information in the region of interest on the detector array using at least one image containing vehicle wheel alignment information.

15. A method according to claim 14 further comprising the steps of reading out from the region of interest a plurality of images containing vehicle wheel alignment information, and processing the images to average the information in the region of interest.

16. A method according to claim 14 wherein the step of identifying a region of interest further comprises defining each of the pixel addresses on the detector array and reading each pixel at its defined address.

17. A method according to claim 14 further comprising the step of sub-array scanning on the detector array.

18. A method according to claim 14 further comprising the steps of processing a portion of the image and stopping image processing upon identification of the region of interest.

19. A method according to claim 14 further comprising the steps of communicating the region of interest to an image sensor controller, limiting row and column scans of the detector array to the region of interest, reading out from the region of interest a plurality of images containing vehicle wheel alignment information, and averaging the images in the region of interest.

20. A user operated vehicle wheel alignment apparatus for calculating wheel alignment angles, comprising:

an integrated circuit image sensor having a detector array for receiving an image containing vehicle wheel alignment information, an image sensor controller for operating the detector array and directing input output for external communications outside the circuit, and an internal bus for communications within the integrated circuit;

a computer system for interfacing with the user of the wheel alignment apparatus;

means for calculating a vehicle wheel alignment from the image containing vehicle wheel alignment information; and an interface bus between the integrated circuit image sensor and the computer system for communications therebetween, wheel alignment information contained in the image being transferred from the integrated circuit to the computer system over the interface bus.

21. The user operated wheel alignment apparatus as set forth in claim 20 wherein the means for calculating the vehicle wheel alignment comprises logic and memory in a processor on the integrated circuit.

22. The user operated wheel alignment apparatus as set forth in claim 20 wherein the means for calculating the vehicle wheel alignment comprises logic and memory in the computer system.

23. The user operated wheel alignment apparatus as set forth in claim 20 wherein the detector array further comprises a region of interest.

24. The user operated wheel alignment apparatus as set forth in claim 23 wherein the image sensor controller further comprises a row decoder and a column decoder for reading out a plurality of images at the region of interest.

25. The user operated wheel alignment apparatus as set forth in claim 24 further comprising a processor for averaging the plurality of images read out from the region-of interest.

* * * * *